(12) United States Patent
Ebrahimi Afrouzi

(10) Patent No.: US 12,117,840 B1
(45) Date of Patent: Oct. 15, 2024

(54) METHOD FOR ROBOTIC DEVICES TO IDENTIFY DOORWAYS USING MACHINE LEARNING

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/212,976

(22) Filed: Jun. 22, 2023

Related U.S. Application Data

(63) Continuation of application No. 17/240,211, filed on Apr. 26, 2021, now Pat. No. 11,726,487, which is a continuation of application No. 15/614,284, filed on Jun. 5, 2017, now abandoned.

(60) Provisional application No. 62/345,979, filed on Jun. 6, 2016.

(51) Int. Cl.
*G05D 1/00* (2024.01)
*A47L 9/28* (2006.01)
*B25J 9/16* (2006.01)

(52) U.S. Cl.
CPC .......... *G05D 1/0221* (2013.01); *A47L 9/2826* (2013.01); *B25J 9/163* (2013.01); *G05D 1/0219* (2013.01); *G05D 1/0248* (2013.01); *G05D 1/0274* (2013.01); *A47L 2201/04* (2013.01)

(58) Field of Classification Search
None
See application file for complete search history.

(56) References Cited

U.S. PATENT DOCUMENTS

| | | | |
|---|---|---|---|
| 2015/0223659 A1* | 8/2015 | Han | A47L 11/4011 134/18 |
| 2016/0297072 A1* | 10/2016 | Williams | G05D 1/0274 |
| 2016/0327954 A1* | 11/2016 | Hoshino | A47L 11/4013 |

* cited by examiner

*Primary Examiner* — Truc M Do

(57) ABSTRACT

A method for identifying a doorway, including: capturing, with a sensor disposed on a robot, sensor data of an environment of the robot as the robot drives along a movement path; identifying, with a processor of the robot, at least one feature from the sensor data indicative of a doorway; identifying, with the processor, the doorway at a location within the environment upon detecting the at least one feature in the sensor data; and generating, with the processor, a map of the environment based on at least the sensor data.

17 Claims, 3 Drawing Sheets

METHOD FOR ROBOTIC DEVICES TO IDENTIFY DOORWAYS USING MACHINE LEARNING

CROSS-REFERENCE TO RELATED APPLICATIONS

This application is a Continuation of U.S. Non-Provisional patent application Ser. No. 17/240,211, filed Apr. 26, 2021, which is a Continuation of U.S. Non-Provisional patent application Ser. No. 15/614,284, filed Jun. 5, 2017, which claims the benefit of U.S. Provisional Patent Application No. 62/345,979, filed Jun. 6, 2016, each of which is hereby incorporated by reference.

FIELD OF THE DISCLOSURE

The disclosure relates to methods for identifying doorways in mobile devices using depth extracting devices such as depth cameras, light detection and ranging (LIDAR) sensors and other distance measurement tools to create maps of work areas. Machine learning techniques are used to identify doorways in an indoor map. Machine learning is used to classify landmarks and openings as doorways or non-doorways based on the collected information, such as measured distances to the surroundings.

BACKGROUND

There have been numerous advances in the automated robotic devices industry and autonomous mobile robots. One issue that has remained elusive is the ability for said robotic device to understand when it is approaching a doorway in order to make a determination based on this information. For instance, with a robotic vacuum, if it encounters an open doorway while cleaning a first room, said robot might enter that doorway and begin cleaning a second room without finishing cleaning the first room. As the robot stores the area cleaned as a map in its memory, this may in turn cause mapping issues in the future because the robot may not realize it has not cleaned two rooms but believes it has only cleaned one room. It is imperative that robotic devices have doorway sensing capabilities in order to make probabilistic estimation about where the boundaries between rooms are, whether to finish cleaning a first room before entering the second room, or whether to ignore cleaning the second room at all.

SUMMARY

Some aspects include a method for identifying a doorway, including: capturing, with a sensor disposed on a robot, sensor data of an environment of the robot as the robot drives along a movement path; identifying, with a processor of the robot, at least one feature from the sensor data indicative of a doorway; identifying, with the processor, the doorway at a location within the environment upon detecting the at least one feature in the sensor data; and generating, with the processor, a map of the environment based on at least the sensor data.

Some aspects provide a robot configured to execute the above-described method.

DETAILED DESCRIPTION OF SOME EMBODIMENTS

Figure 1:
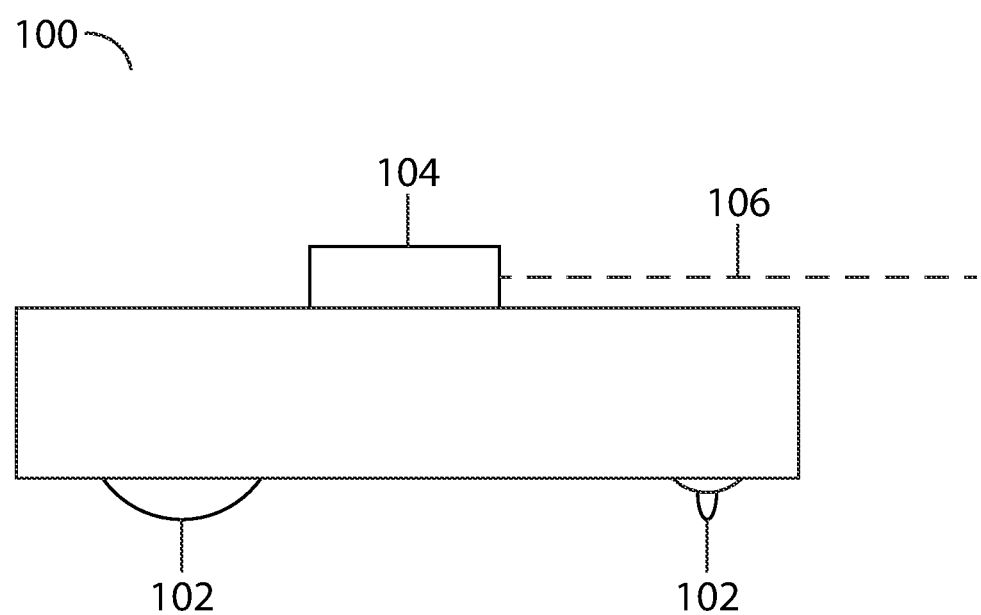
FIG. 1 illustrates a side elevation view of a mobile robotic device, according to some embodiments.

Some embodiments provide a method for a mobile device to detect physical doorways.

Some embodiments provide a method for a mobile device to generate a two-dimensional map, including the presence of doorways, for navigation using a LIDAR sensor, depth camera, time of flight (TOF) sensor or other distance measurement devices.

Some embodiments provide a method for a mobile device with a LIDAR sensor, depth camera, TOF sensor or other distance measurement devices to have a machine learning algorithm which can identify the features of doorways and non-doorways.

Some embodiments provide a method for a mobile device to have a training set which includes two-dimensional maps of numerous sample environments with doorway features.

Some embodiments provide a method for a mobile device to determine the probability as to whether or not a doorway is present based on comparing the information obtained from the LIDAR sensor, depth camera, TOF sensor or other distance measurement devices with the two-dimensional map provided in the training set.

Some embodiments provide a method for a mobile device to develop a classifier system based on doorway features for use while working.

Some embodiments provide a method for a mobile device to enact a specific coverage pattern based on the presence of a doorway.

Some embodiments provide a method for a mobile device to understand the existence of a doorway to ensure thorough cleaning coverage of each separate workspace.

Some embodiments provide a method for a mobile device to avoid entering a doorway in order to clean a workspace completely prior to entering a second workspace and cleaning the second workspace.

Some embodiments use a LIDAR sensor, depth camera, TOF sensor or other distance measurement devices mounted or positioned within the mobile robot to detect distances to the surrounding objects by analysis using a classifier machine learned algorithm, such as those using regression techniques, support vector machines, binary classifiers or the like, to identify the presence of a doorway in the mapped environment. Based on input from the sensor, and the resulting identifications of the existence of a doorway or not, the device may be configured to activate various movement patterns. In one embodiment, an identified doorway is marked in a map of the workspace. In another embodiment, the device is programmed to treat the doorway as a linear obstacle and to not cross the area identified as a doorway. In another embodiment, the device may be programmed to not cross a doorway until the device has encountered the doorway a minimum number of times. In still another embodiment, the device may be programmed to enter a doorway into a second workspace to clean the second workspace prior to finishing cleaning the first workspace.

Some embodiments introduce a method for identifying doorways in the work environments of mobile robotic devices utilizing LIDAR sensors, depth sensors, TOF sensors, stereo vision, and other distance or depth measuring technologies to generate a map for navigation. A mobile robotic device may include a form of distance measuring device which measures distances to all the areas surrounding the robot. For example, a LIDAR distance measuring system may capture the distances to obstacles in 360 degrees and generate points in a 2D grid map to create a two-dimensional map of the work environment at the height of the LIDAR sensor using simultaneous localization and mapping (SLAM) techniques. The same kind of 2D or 3D maps may be generated by all measurement devices that can measure the distance to the surroundings. For example, LIDAR technology or depth cameras or stereo vision cameras may generate measurements to surroundings to create maps of work environments using SLAM algorithms such that mobile robotic devices may better navigate through the environment. However, with current SLAM methods the whole map is treated with the same preference. In one example, using a robotic floor cleaner, it may be preferable to have a robotic floor cleaning system completely clean a first room prior to allowing the robotic cleaning device to clean a second room. One solution may include providing a virtual barrier device or the like at the location of the doorway. However, it is more advantageous to design the mobile robot itself such that it may automatically detect a doorway without need for external additional components. The following descriptions provide a method for identifying doorways based on measurements taken by, for example, a LIDAR sensor.

Some embodiments use a supervised machine learning algorithm to identify features of doorways and non-doorways. A training set provides two-dimensional maps of numerous sample environments with corresponding robot positions within those maps. All of the areas of each sample environment may be identified by an administrator as either a doorway or non-doorway. In this way, the system may extract the common features of both doorways and non-doorways. The differences between the distance to a first obstacle and the distance to a second obstacle may be analyzed by the system iteratively, such that distance differences that distinguish doorways are identified. From the training set, and using a common supervised learning classifier, the machine may infer locations that have a high probability of being a doorway. The map created by the SLAM algorithm based on the input received from sensors of the robot may be considered a test set and the machine learning algorithm may examine the data on an online manner during the progress of the work session. As measurements are taken, the classifier may be applied to identify areas as doorways or non-doorways.

In some embodiments, upon identifying a doorway, the doorway may be marked in a map of the workspace.

In some embodiments, the mobile device may be programmed to treat identified doorways as linear obstacles and not cross the area identified as a doorway.

In some embodiments, the mobile device may be programmed to treat identified doorways as linear obstacles and not cross the area identified as a doorway for a predetermined amount of time or until the device has encountered the doorway a minimum number of times.

In some embodiments, the mobile device may be programmed to enter a doorway into a second workspace before reentering the doorway in the opposite direction to complete the cleaning of the first workspace.

FIG. 1 illustrates a side elevation view of mobile device 100, according to some embodiments. Mobile device 100 includes wheels 102 and LIDAR sensor 104. Line 106 represents a light beam emitted by the LIDAR sensor 104 in capturing distance data. In some embodiments, LIDAR sensor 104 may be rotatable about an axis perpendicular to the plane of the work surface such that distance measurements may be captured in 360 degrees around the mobile device.

Figure 2:
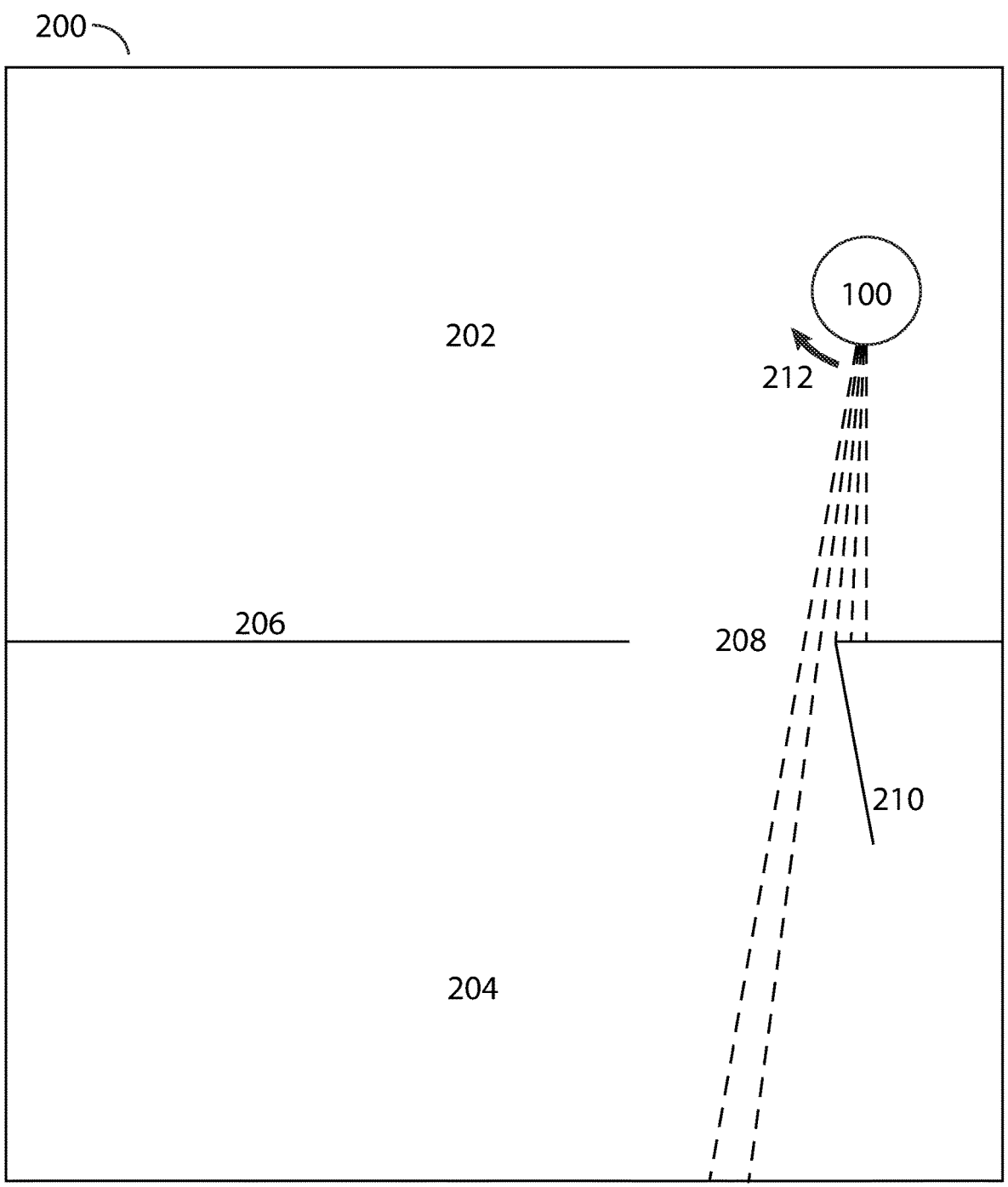
FIG. 2 illustrates an overhead view of a mobile robotic device identifying a doorway, according to some embodiments.

FIG. 2 illustrates an overhead view of an example workspace 200. Workspace 200 has two sections, room 202 and room 204 that are divided by wall 206. Doorway 208 connects the two sections when door 210 is open. Lines 106 represent the light beams used to capture distance data. As the LIDAR sensor rotates in a clockwise direction 212, distance measurements from the mobile device 100 to the nearest obstacle increase suddenly when the LIDAR sensor begins measuring the distances within the doorway 208. The sudden increase in distance may be identified as a doorway using a classifier. As the LIDAR sensor continues to rotate in clockwise direction 212, the distances measured suddenly decrease when the LIDAR sensor reaches the end of the doorway 208 and the measurements taken reflect the distance from the mobile device to the wall 206. The sudden decrease in distance may be identified as the end of the doorway using the classifier. Identification of a doorway may be used in a variety of different ways without limitation. In some embodiments, upon identifying a doorway, mobile devices mark the location of the doorway in a digital map of the workspace. In some embodiments, mobile devices are programmed not to cross identified doorways for a predetermined amount of time or until the mobile device has encountered the doorway a predetermined number of times.

Figure 3:
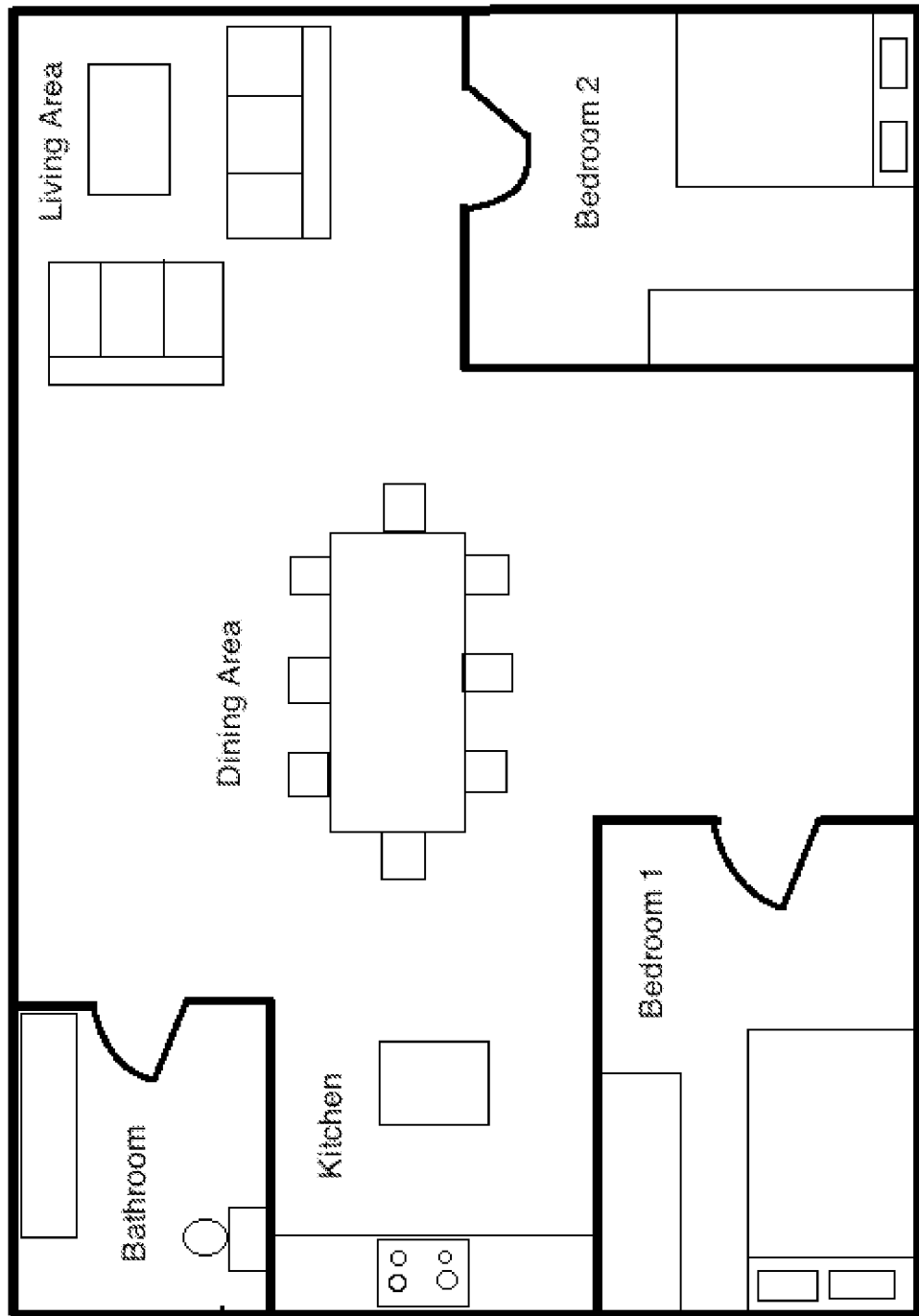
FIG. 3 illustrates an example of a floor plan type provided in a training set to the mobile robotic device.

FIG. 3 illustrates an example of a floor plan type provided in a training set to the mobile robotic device.

The invention claimed is:

1. A method for identifying a doorway, comprising:
capturing, with a sensor disposed on a robot, sensor data of an environment of the robot as the robot drives along a movement path;
identifying, with a processor of the robot, at least one feature from the sensor data indicative of a doorway;
identifying, with the processor, the doorway at a location within the environment upon detecting the at least one feature in the sensor data;
instructing, with the processor, the robot to execute one or more actions upon identifying the doorway, wherein:
the one or more actions comprises avoiding crossing the doorway, wherein the doorway is identified by the robot as a virtual barrier; and
the robot avoids crossing the doorway for a predetermined amount of time or until encountering the identified doorway a predetermined number of times; and
generating, with the processor, a map of the environment based on at least the sensor data.

2. The method of claim 1, wherein:
the sensor data is indicative of a distance to objects within the environment; and
the sensor comprises at least one of: a light detecting and ranging (LIDAR) sensor, a depth camera, a time-of-flight (TOF) sensor, and a stereo vision system.

3. The method of claim 1, wherein the at least one feature is identified using a machine learning algorithm.

4. The method of claim 3, wherein the machine learning algorithm is trained using training sets of sensor data.

5. The method of claim 4, wherein the training sets of sensor data comprise sets of sensor data used in generating maps of environments.

6. The method of claim 4, wherein the training sets of sensor data are chosen based on a region, a type of area, or a country within which the robot is to operate.

7. The method of claim 1, further comprising:
marking, with the processor, the doorway at the location in the map of the environment.

8. The method of claim 1, further comprising:
determining, with the processor, a probability of the doorway existing at the location based on at least the sensor data.

9. The method of claim 1, wherein:
the one or more actions comprises finishing a first task in a first work area before crossing the doorway into a second work area to perform a second task; and
the first task and the second task comprise cleaning the first work area and the second work area, respectively.

10. The method of claim 1, wherein the one or more actions comprises executing a particular coverage pattern.

11. The method of claim 1, further comprising:
dividing, with the processor, the map of the environment into separate areas using identified doorways as the dividers for dividing the map of the environment into the separate areas.

12. The method of claim 1, wherein:
the sensor data is indicative of a distance to objects within the environment; and
identifying the at least one feature comprises:
detecting, with the processor, an increase in the distances to objects by at least a first predetermined amount followed by a decrease in the distances to objects by at least a second predetermined amount.

13. The method of claim 12, wherein the increase in distances to objects is detected for at least a first predetermined number of time steps and the decrease in distances to objects is detected for at least a second predetermined number of time steps.

14. The method of claim 13, wherein the processor determines at least one of the values of the first predetermined amount, the first predetermined number of time steps, the second predetermined amount, and the second predetermined number of time steps using at least one of training sets of sensor data and a machine learning algorithm.

15. A robot, comprising:
a chassis;
a set of wheels;
a plurality of sensors; and
a processor;
wherein the robot is configured to:
capture, with a sensor of the plurality of sensors disposed on the robot, sensor data of an environment of the robot as the robot drives along a movement path;
identify, with the processor, at least one feature from the sensor data indicative of a doorway;
identify, with the processor, the doorway at a location within the environment upon detecting the at least one feature in the sensor data;
instruct, with the processor, the robot to execute one or more actions upon identifying the doorway, wherein:
the one or more actions comprises avoiding crossing the doorway, wherein the doorway is identified by the robot as a virtual barrier; and
the robot avoids crossing the doorway for a predetermined amount of time or until encountering the identified doorway a predetermined number of times; and
generate, with the processor, a map of the environment based on at least the sensor data.

16. The robot of claim 15, wherein the robot is further configured to:
instruct, with the processor, the robot to execute one or more actions upon identifying the doorway, wherein:
the one or more actions comprises at least one of finishing a first task in a first work area before crossing the doorway into a second work area to perform a second task and avoiding crossing the doorway; and
the first task and the second task comprise cleaning the first work area and the second work area, respectively.

17. The robot of claim 15, wherein at least one of:
the robot is further configured to:
divide, with the processor, the map of the environment into separate areas using identified doorways as the dividers for dividing the map of the environment into the separate areas; or
the sensor data is indicative of a distance to objects within the environment; and identifying the at least one feature comprises:
detecting, with the processor, an increase in the distances to objects by at least a first predetermined amount followed by a decrease in the distances to objects by at least a second predetermined amount.

* * * * *